(12) United States Patent
Satsuma

(10) Patent No.: US 7,741,807 B2
(45) Date of Patent: Jun. 22, 2010

(54) BATTERY CHARGER

(75) Inventor: Eiji Satsuma, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 225 days.

(21) Appl. No.: 11/526,676

(22) Filed: Sep. 26, 2006

(65) Prior Publication Data

US 2007/0069688 A1    Mar. 29, 2007

(30) Foreign Application Priority Data

Sep. 29, 2005    (JP) ............... 2005-285638

(51) Int. Cl.
  *H02J 7/00* (2006.01)
  *H01M 2/02* (2006.01)
  *H01M 2/16* (2006.01)

(52) U.S. Cl. ............ 320/107; 320/112; 320/113; 429/178; 429/99; 429/98

(58) Field of Classification Search ............ 320/110, 320/112, 113, 133, 106, 107, 128, 111, 160; 429/178, 7, 100, 96, 99, 98, 177, 176; 439/500
See application file for complete search history.

(56) References Cited

U.S. PATENT DOCUMENTS

| 4,403,182 | A | * | 9/1983 | Yeh ............... 320/110 |
| 4,766,361 | A | * | 8/1988 | Pusateri ............... 320/110 |
| 4,816,735 | A | * | 3/1989 | Cook et al. ............... 320/110 |
| 5,057,761 | A | * | 10/1991 | Felegyhazi, Sr. ............... 320/110 |
| 5,606,238 | A | * | 2/1997 | Spellman et al. ............... 320/110 |
| 5,652,496 | A | * | 7/1997 | Pilarzyk et al. ............... 320/106 |
| 5,686,811 | A | * | 11/1997 | Bushong et al. ............... 320/110 |
| 6,186,824 | B1 | * | 2/2001 | Lee ............... 439/500 |
| 6,610,941 | B2 | * | 8/2003 | Pfeiffer ............... 200/61.58 R |
| 6,876,172 | B2 | * | 4/2005 | Lam et al. ............... 320/110 |
| 7,187,156 | B2 | * | 3/2007 | Nakasho et al. ............... 320/107 |
| 2006/0103347 | A1 | * | 5/2006 | Shum ............... 320/110 |

FOREIGN PATENT DOCUMENTS

| JP | 2-119537 | 5/1990 |
| JP | 2002-42757 | 2/2002 |
| JP | 3667991 | 7/2005 |

* cited by examiner

*Primary Examiner*—Patrick J Assouad
*Assistant Examiner*—Alexis Boateng
(74) *Attorney, Agent, or Firm*—Wenderoth, Lind & Ponack, L.L.P.

(57) ABSTRACT

The type of the attached batteries is determined by decision switch mechanisms. A protruding region is established in the attachment section to provide contact between charging terminals and the electrodes of short batteries. A stepped shelf region is established with the protruding region, and long batteries are mounted inside the attachment section on top of the stepped shelf region. Charging terminals are disposed in electrode alignment surface of the stepped shelf region, and decision switch mechanisms are housed inside the stepped shelf region. A decision switch mechanism is a switch that switches when pressed by the battery electrode of either a long battery or a short battery loaded in the attachment section. The control circuit switches charging current between a first charging current and a second charging current depending on the OFF or ON state of the decision switch mechanisms.

20 Claims, 12 Drawing Sheets

PRIOR ART

BATTERY CHARGER

BACKGROUND OF THE INVENTION

This invention relates to a battery charger that can freely attach and detach, and charge both long batteries and short batteries.

A battery charger has been developed that allows either long or short batteries to be attached, and allows each battery to be charged with appropriate current by switching the charging current (for example, refer to JP 3667991B). A battery charger provided with this type of switch-able structure is shown in FIGS. 1-4. FIG. 2 shows attachment of a long battery, and FIG. 3 shows attachment of a short battery.

The case 91 shown in the figures is made in a configuration that allows both long batteries 93A and short batteries 93B to be attached in an attachment section 92. Since long batteries 93A and short batteries 93B are of different overall length, rotating electrode pieces 95 are provided at the positive electrode end of the attachment section 92 to accept both battery types. Rotating electrode pieces 95 are mounted in the case 91 in a manner that allows them to rotate. When rotating electrode pieces 95 are rotated to the position shown in FIG. 2, long batteries 93A can be attached in the attachment section 92. When rotating electrode pieces 95 are rotated to the position shown in FIG. 3, short batteries 93B can be attached in the attachment section 92.

The rotating electrode pieces 95 rotate 90° to switch between long batteries 93A and short batteries 93B. As shown in FIG. 2, long batteries 93A are accepted with rotating electrode pieces 95 in the vertical position, and as shown in FIG. 3, short batteries 93B are accepted with rotating electrode pieces 95 dropped to the horizontal position. Overall length of the attachment section 92 is lengthened for long battery 93A attachment with rotating electrode pieces 95 in the upright position. Overall length of the attachment section 92 is shortened for short battery 93B attachment with rotating electrode pieces 95 dropped to the horizontal position.

The battery charger of FIG. 1 has its rotating electrode pieces 95 divided into a left piece and right piece, each of which can rotate independently. As shown in FIG. 4, this battery charger can charge long batteries 93A and short batteries 93B as sets of two rechargeable batteries 93 each.

SUMMARY OF THE INVENTION

A battery charger with the structure described above can charge either long batteries or short batteries by rotating the rotating electrode pieces. Meanwhile, since charging currents are different for proper charging of long and short batteries, it is necessary to provide some switching such as in the charging power supply circuit. To switch charging conditions between settings for long and short batteries, one method has the user switch mechanical switches, and another method links mechanical switches to rotating electrode piece rotation. However, in the method of manual switching by the user, there is concern that proper charging will not occur due to mis-setting, such as the user putting a switch in a mistaken position or forgetting to move the switches altogether. In the method of switching the power supply circuit via linkage with rotating electrode piece rotation, there is no concern about this type of mis-setting. However, each time the type of rechargeable battery (long or short) set in the battery charger is changed, it is necessary for the user to rotate the respective rotating electrode piece. This has the drawback of being troublesome. Furthermore, the battery charger described above requires a large amount of space to house the rotating electrode pieces, and thereby has the additional drawback that such a switchable configuration cannot be housed in a small space.

The present invention was developed to solve the problems described above. Thus, it is a primary object of the present invention to provide a battery charger that can charge both long batteries and short batteries with charging current suitable for each battery type without the user having to switch between long and short batteries. In particular, it is an object of the present invention to provide a battery charger that can house a mechanism in a small space to distinguish whether a battery set in an attachment section is a long battery or a short battery. The above and further objects and features of the invention will more fully be apparent from the following detailed description with accompanying drawings.

To resolve the problems described above, there are eight aspects of the present invention. In the first aspect of the present invention, a battery charger is provided with a case having a battery attachment section to allow long batteries and short batteries to be attached; charging terminals to connect to, and supply charging current to electrodes at both ends of long batteries and short batteries attached in the attachment section of the case; decision switch mechanisms to determine the type of batteries attached in the attachment section; and a control circuit to control charging current to batteries attached in the attachment section via signals from the decision switch mechanisms. A first pair of charging terminals to charge long batteries, and second pair of charging terminals to charge short batteries are disposed in opposing positions in the attachment section. A protruding region is established in the attachment section to insure contact between charging terminals and the electrodes of short batteries, which are not as long as long batteries. A stepped shelf region is established with the protruding region, and long batteries are mounted inside the attachment section on top of the stepped shelf region. Charging terminals are disposed in electrode alignment surface of the stepped shelf region, and decision switch mechanisms are housed inside the stepped shelf region. A decision switch mechanism is a switch that switches OFF or ON when pressed by the battery electrode of either a long battery or a short battery loaded in the attachment section. The control circuit switches charging current between a first charging current and a second charging current to charge long batteries and short batteries depending on the OFF or ON state of the decision switch mechanisms.

The battery charger described above can charge both long batteries and short batteries with charging current suitable for each battery type without user switch selection for long or short batteries. This is because the type of battery loaded in the attachment section of a battery charger of the present invention is determined by a decision switch mechanism, which is a switch that switches OFF or ON when pressed by the battery electrode of either a long battery or a short battery. In addition, the control circuit switches charging current to a first charging current or a second charging current depending on the OFF or ON state of a decision switch mechanism. This battery charger can charge long and short batteries with optimum charging current while circuit structure to distinguish between long and short batteries is extremely simple. The battery charger of the present invention is provided with stepped shelf region in conjunction with the protruding region established in the attachment section, and long batteries are disposed on top of the stepped shelf region. In particular, since decision switch mechanisms are housed inside the stepped shelf region, the present invention is characterized by allowing the mechanisms that distinguish between long and short batteries loaded in the attachment section to be disposed in a small space.

In the second aspect of the present invention, a battery charger is provided with common charging terminals that are charging terminals disposed at one end of the attachment section to contact electrodes at one end of long batteries and short batteries; long battery charging terminals to contact electrodes at the other end of long batteries loaded in the attachment section; and short battery charging terminals to contact electrodes at the other end of short batteries loaded in the attachment section. Long battery charging terminals are disposed in positions which align with the electrodes of long batteries mounted on top of the stepped shelf region, and short battery charging terminals are disposed in the electrode alignment surfaces of the stepped shelf region.

In the third aspect of the present invention, a battery charger has a decision switch mechanism that is made up of a short battery charging terminal and a long battery charging terminal. A short battery charging terminal is formed of sheet metal that can deform in a resilient fashion. A short battery charging terminal is disposed in a position where it contacts a long battery charging terminal when pressed upon by a short battery loaded in the attachment section, and where it is separated from, and not in contact with the long battery charging terminal when not pressed by a short battery. When a short battery is loaded in the attachment section of this battery charger, the short battery presses against a short battery charging terminal, which contacts a long battery charging terminal. The control circuit detects contact between the short battery charging terminal and the long battery charging terminal, and the short battery is charged with the second charging current. Further, when a short battery is not loaded but a long battery is loaded in the attachment section, the short battery charging terminal is not pressed by a short battery and is separated from the long battery charging terminal. The control circuit detects no contact between the short battery charging terminal and the long battery charging terminal, and the long battery is charged with the first charging current.

The battery charger described above has a unique short battery charging terminal structure that distinguishes between long batteries and short batteries and supplies charging current when contacted by a short battery electrode. This short battery charging terminal contacts a long battery charging terminal when pressed upon by a short battery loaded in the attachment section. The control circuit detects whether or not a short battery charging terminal has contacted a long battery charging terminal. The control circuit detects contact between a short battery charging terminal and a long battery charging terminal to control charging current. Specifically, when a short battery charging terminal contacts a long battery charging terminal, charging current is set to the second charging current for a short battery loaded in the attachment section. When a short battery charging terminal does not contact a long battery charging terminal, charging current is set to the first charging current. As a result, long batteries and short batteries can be distinguished and charged with optimum charging current while employing an extremely simple circuit structure.

In the fourth aspect of the present invention, a battery charger has a long battery charging terminal disposed behind the backside of a short battery charging terminal inside a stepped shelf region. A short battery loaded in the attachment section presses the short battery charging terminal towards the long battery charging terminal causing the short battery charging terminal to contact the long battery charging terminal.

In the fifth aspect of the present invention, a battery charger has a decision switch mechanism that is made up of a long battery charging terminal and a short battery charging terminal. A long battery charging terminal is sheet metal that can deform in a resilient fashion. A long battery charging terminal is disposed in a position where it contacts a short battery charging terminal when pressed upon by a long battery loaded in the attachment section, and where it is separated from, and not in contact with the short battery charging terminal when not pressed by a long battery. When a long battery is loaded in the attachment section of this battery charger, the long battery presses against a long battery charging terminal, which contacts a short battery charging terminal. The control circuit detects contact between the long battery charging terminal and the short battery charging terminal, and the long battery is charged with the first charging current. Further, when a long battery is not loaded but a short battery is loaded in the attachment section, the long battery charging terminal is not pressed by a long battery and is separated from the short battery charging terminal. The control circuit detects no contact between the long battery charging terminal and the short battery charging terminal, and the short battery is charged with the second charging current.

In the sixth aspect of the present invention, a battery charger has a control circuit that detects the voltage of a short battery charging terminal to determine contact or separation of the short battery charging terminal and long battery charging terminal.

In the seventh aspect of the present invention, a battery charger has a control circuit that detects voltage of a long battery charging terminal to control charging current for a long battery.

Finally, in the eighth aspect of the present invention, a battery charger case has an attachment section with battery pockets that can hold four rows of long batteries or short batteries.

DETAILED DESCRIPTION OF THE PREFERRED EMBODIMENTS

Figure 1:
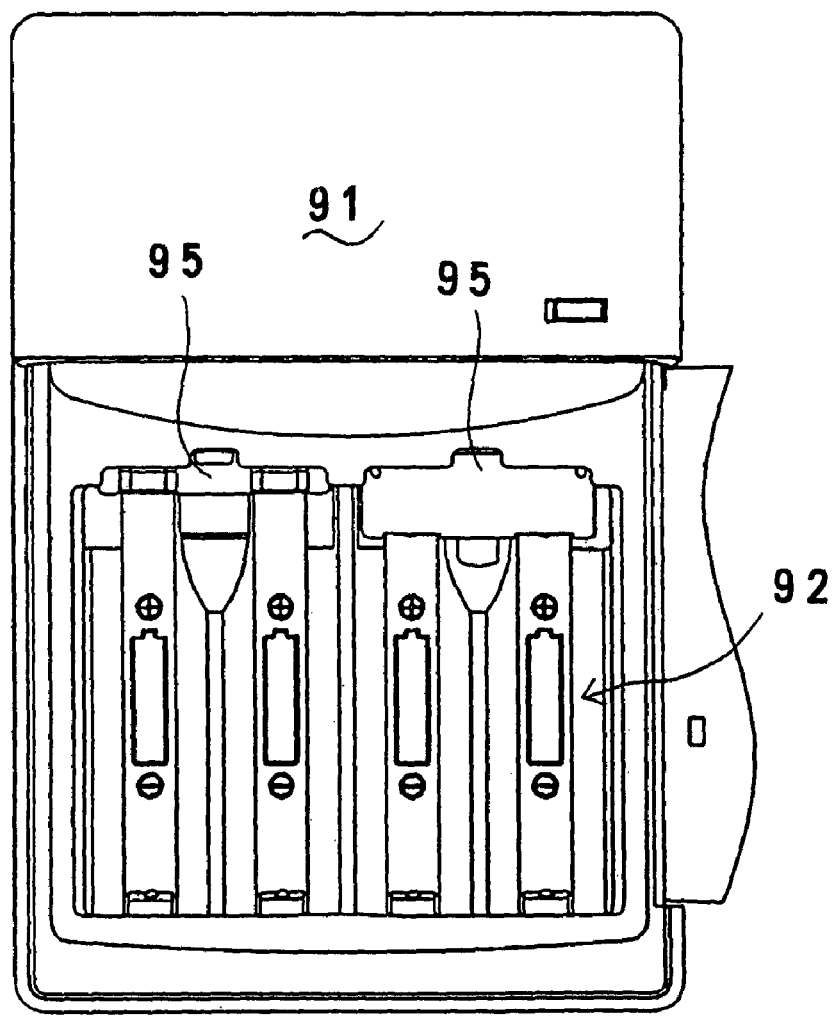
FIG. 1 is a plan view of a prior art battery charger.
Figure 2:
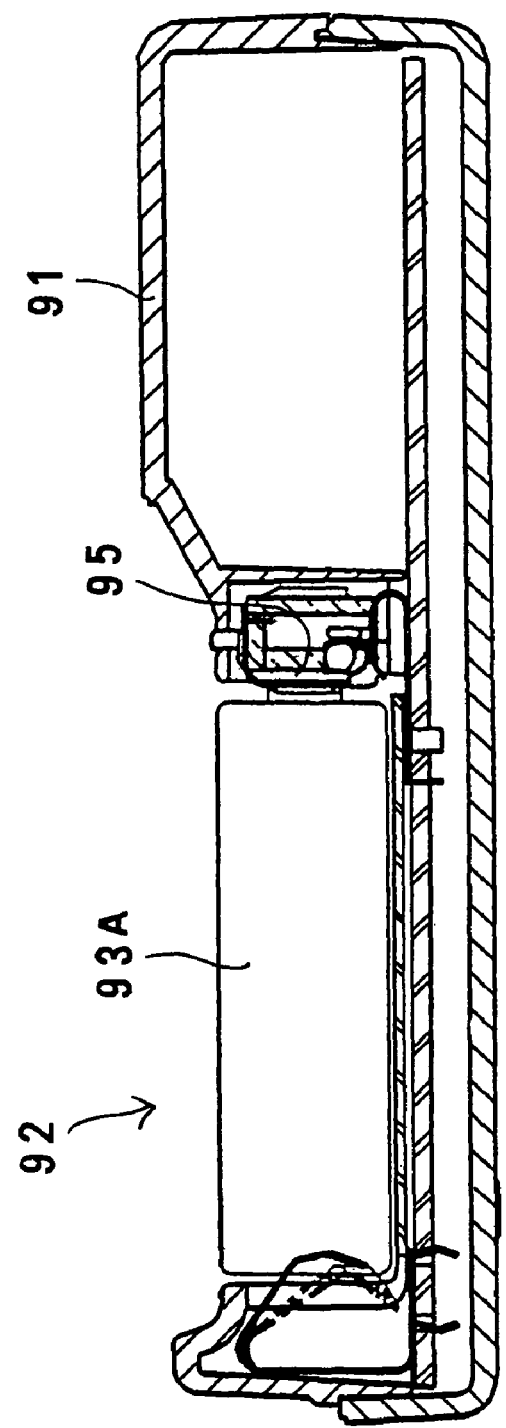
FIG. 2 is a lengthwise cross-sectional view showing a long battery attached in the battery charger shown in FIG. 1.
Figure 3:
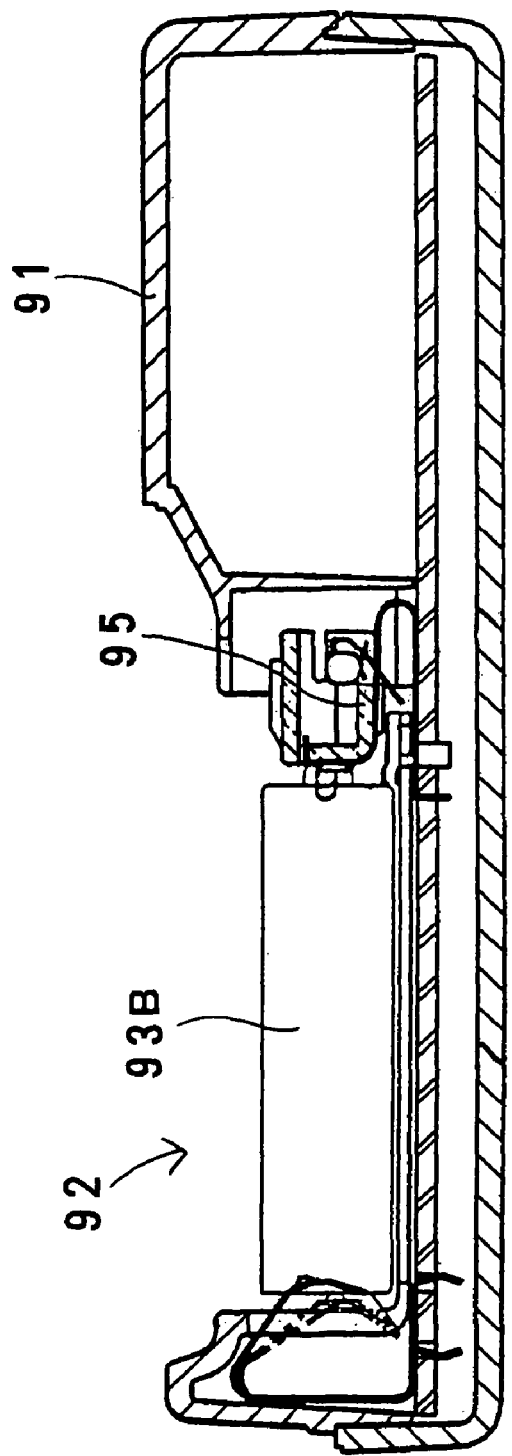
FIG. 3 is a lengthwise cross-sectional view showing a short battery attached in the battery charger shown in FIG. 1.
Figure 4:
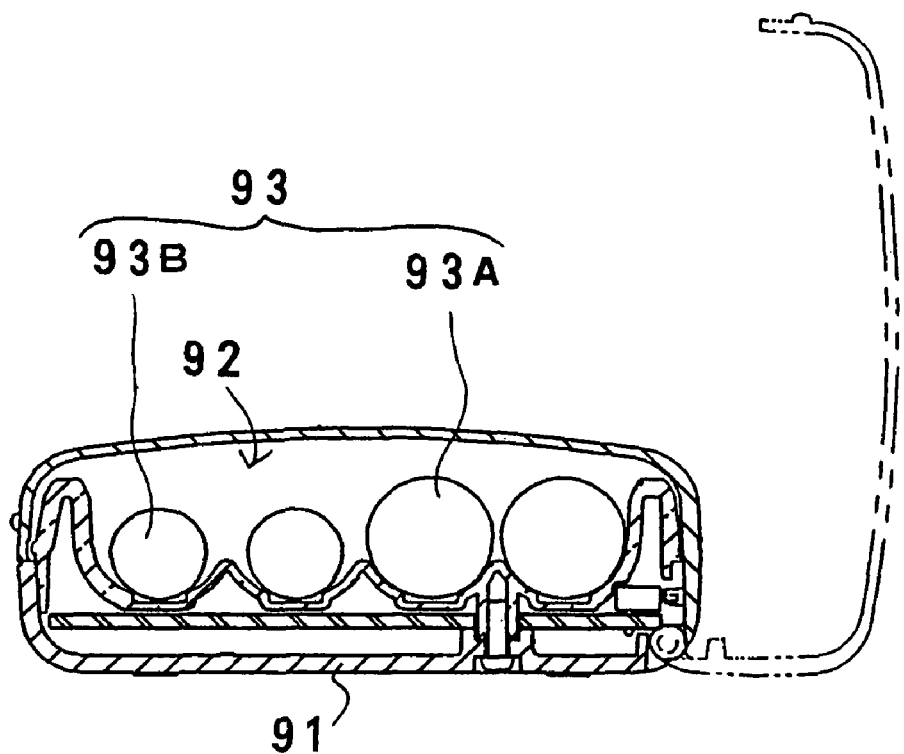
FIG. 4 is a lateral cross-sectional view showing long batteries and short batteries attached in the battery charger shown in FIG. 1.
Figure 5:
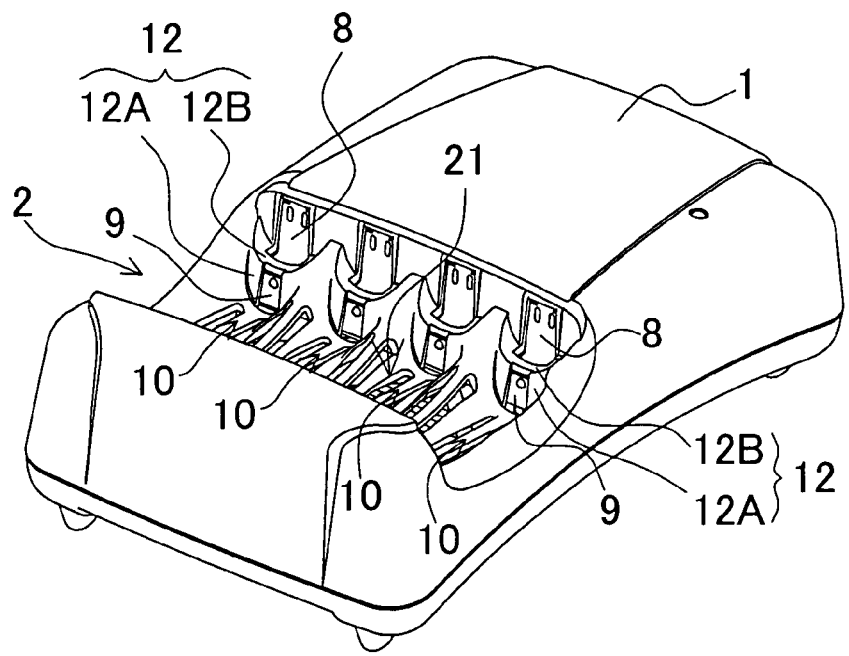
FIG. 5 is a perspective view of a battery charger for one embodiment of the present invention.
Figure 6:
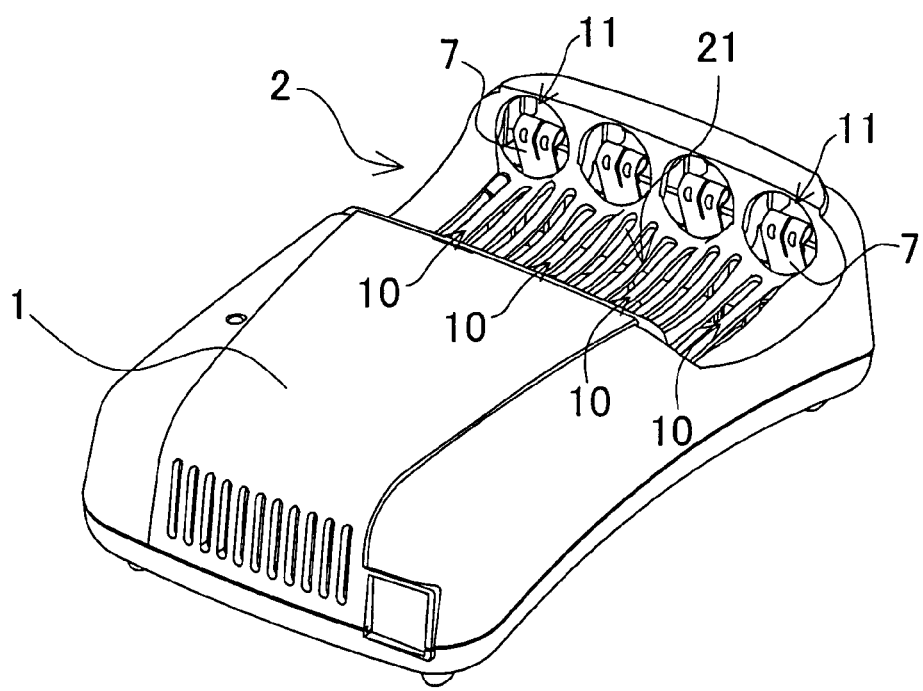
FIG. 6 is a perspective view of the backside of the battery charger shown in FIG. 5.

The battery charger shown in FIGS. 5-9 is provided with a case 1 having a battery attachment section 2 to allow long batteries 3A and short batteries 3B to be attached; charging terminals 4 to contact and supply charging current to electrodes at both ends of long batteries 3A and short batteries 3B attached in the attachment section 2 of the case 1; decision switch mechanisms 5 to determine the type of batteries 3 attached in the attachment section 2; and a control circuit to control charging current to batteries 3 attached in the attachment section 2 via signals from the decision switch mechanisms 5. This battery charger has a battery attachment section 2 established in the upper surface of the case 1 to allow short batteries 3B and long batteries 3A to be attached and detached. This battery charger charges each short battery 3B and long battery 3A with its optimum charging current. The case 1 has a control circuit (not illustrated) housed inside, and it determines the type of batteries 3 set in the attachment section 2, and controls charging currents. A short battery 3B has an approximately circular cylindrical shape, and is shorter in the lengthwise direction than a long battery 3A. A long battery 3A has an approximately circular cylindrical shape, and is longer in the lengthwise direction than a short battery 3B. For example, short batteries 3B set in the battery attachment section 2 of a battery charger can be AAA battery (triple-A) batteries and long batteries 3A can be AA battery (double-A) batteries.

A plurality of circular cylindrical rechargeable batteries 3 is attached in the battery attachment section 2 of these figures, and batteries 3 are arranged laterally in parallel orientation and connected in parallel. In the battery charger shown in FIGS. 5-9, four rows of battery pockets 10 are provided to hold four batteries 3 arranged in parallel orientation in the battery attachment section 2. However, the battery charger can also be provided with battery pockets to hold two batteries or six batteries arranged in parallel orientation in the battery attachment section.

Both long batteries 3A and short batteries 3B are individually set in battery pockets 10 in the attachment section 2. A first pair of charging terminals 4 to charge long batteries 3A, and second pair of charging terminals 4 to charge short batteries 3B are disposed in opposing positions in the attachment section 2. In the attachment section 2 of the figures, alignment holes 11 are established at one end of the battery pockets 10 to insert long battery 3A and short battery 3B end regions. One side of each charging terminal pair 4 is disposed inside an alignment hole 11.

Further, in the battery attachment section 2 shown in FIGS. 5-9, protruding regions are established at the other end of the battery pockets 10 to allow contact between charging terminals 4 and the electrodes of short batteries 3B, which are not as long as long batteries 3A. Stepped shelf regions 12 are established with the protruding regions inside the battery attachment section 2, and long batteries 3A are mounted inside the attachment section 2 in fixed positions on top of the stepped shelf regions 12. The stepped shelf regions 12 of the figures are provided with electrode alignment surfaces 12A disposed to face an electrode at one end of a short battery 3B loaded in a battery pocket 10, and shelf surfaces 12B to support one end of a long battery 3A loaded in a battery pocket 10. A stepped shelf region 12 supports an end of a long battery 3A in a fixed position on top of a shelf surface 12B, or it holds an end of a short battery 3B in a fixed position inside an electrode alignment surface 12A. These battery pocket 10 stepped shelf regions 12 hold the ends of long batteries 3A and short batteries 3B in vertically staggered fixed positions.

Figure 7:
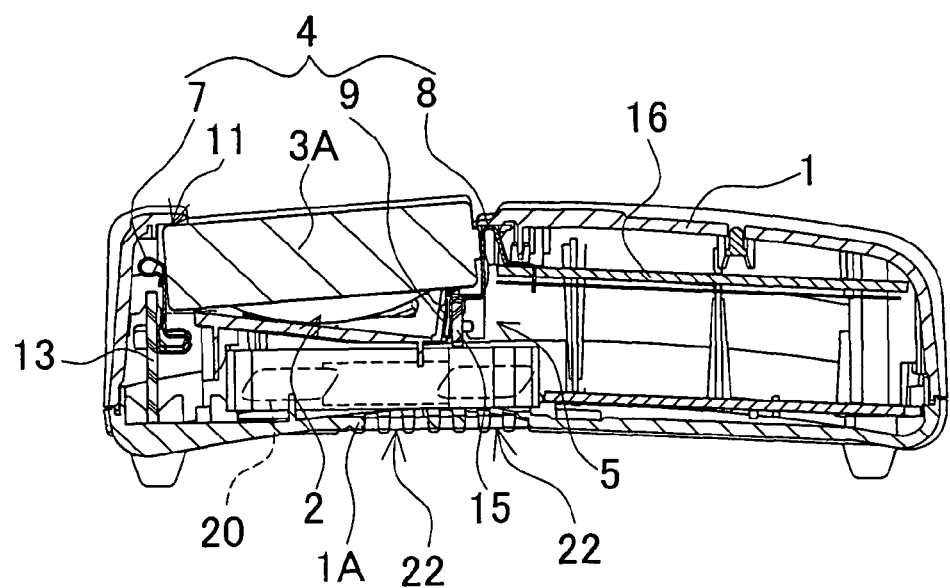
FIG. 7 is a cross-sectional view showing a long battery attached in the battery charger shown in FIG. 5.
Figure 8:
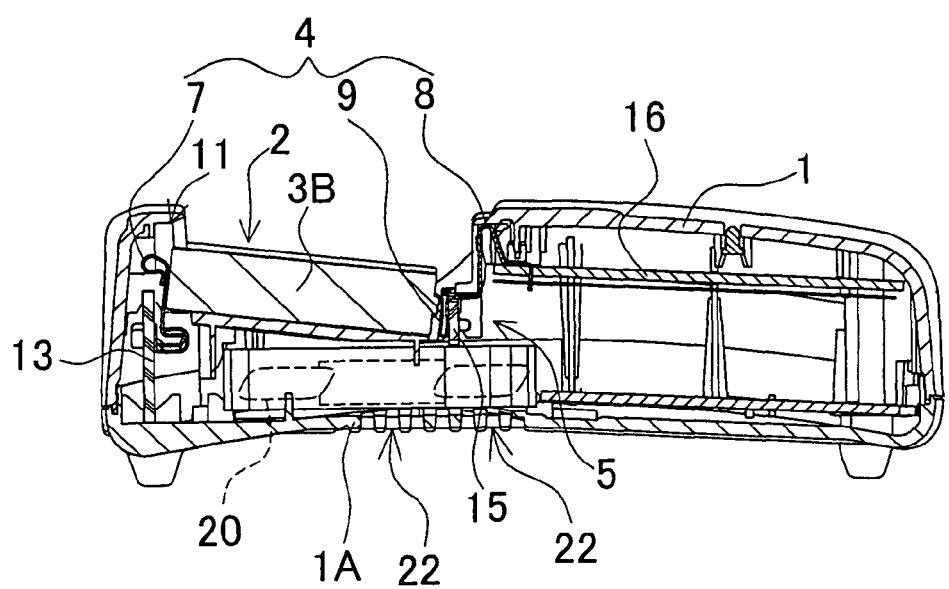
FIG. 8 is a cross-sectional view showing a short battery attached in the battery charger shown in FIG. 5.
Figure 9:
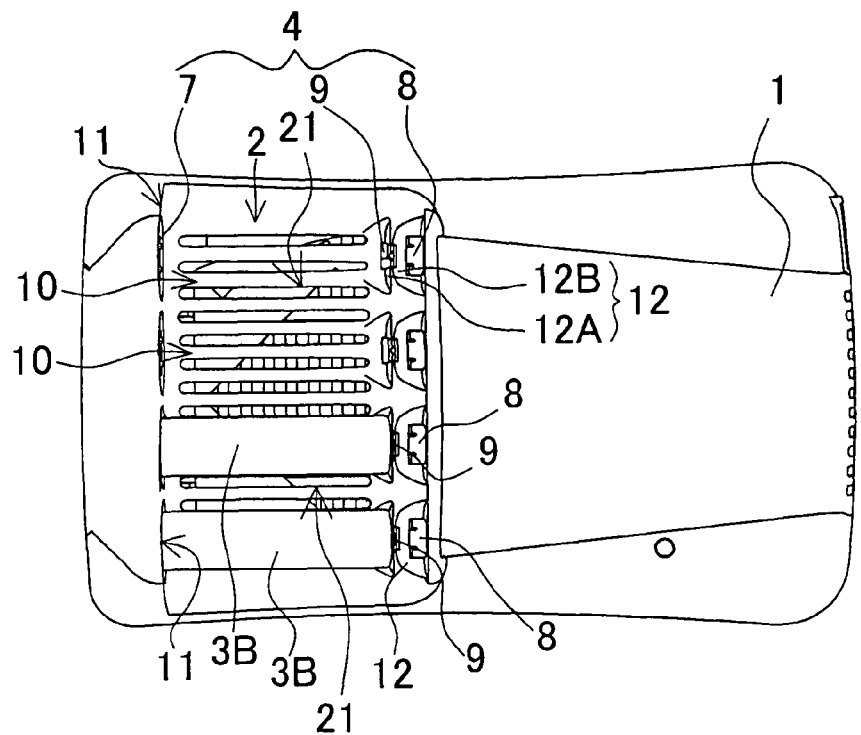
FIG. 9 is a plan view showing short batteries attached in the battery charger shown in FIG. 5.

In the battery charger shown in FIGS. 5-9, charging terminals 4 at one end of the battery pockets 10 are taken as common charging terminals 7, and charging terminals 4 at the other end are taken as long battery charging terminals 8 and short battery charging terminals 9. Common charging terminals 7 are disposed inside alignment holes 11 and contact long batteries 3A and short batteries 3B inserted in those alignment holes 11. This battery charger charges long batteries 3A by contacting electrodes at both ends with common charging terminals 7 and long battery charging terminals 8. It also charges short batteries 3B by contacting electrodes at both ends with common charging terminals 7 and short battery charging terminals 9. As shown in FIGS. 7 and 8, this battery charger holds long batteries 3A in an upper level on top of the stepped shelf regions 12, and holds short batteries 3B in a lower level inserted inside electrode alignment surfaces 12A in front of the stepped shelf regions 12. As shown in the figures, short batteries 3B are set lower than long batteries 3A for charging in this battery charger.

Figure 10:
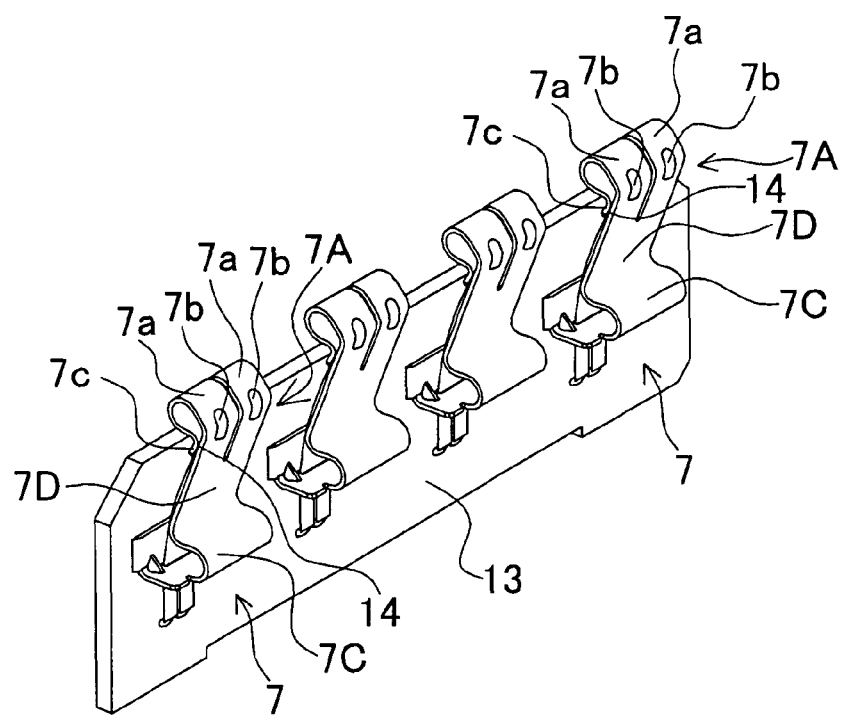
FIG. 10 is a perspective view showing common connection terminals.
Figure 11:
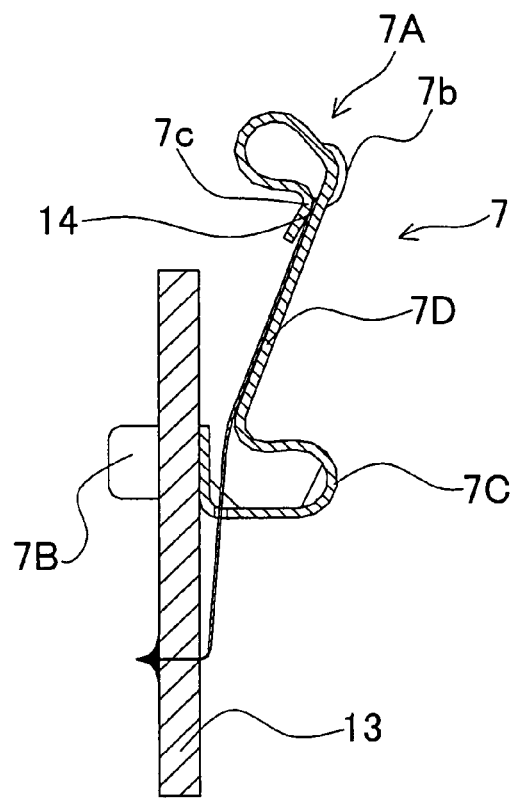
FIG. 11 is a cross-sectional view of the common connection terminals shown in FIG. 10.

The common charging terminals 7 are shown in FIGS. 10 and 11. The negative electrodes (flat-surface electrodes) of long batteries 3A and short batteries 3B loaded in battery pockets 10 contact the common charging terminals 7 shown in these and other figures. Common charging terminals 7 with this structure are produced by sheet metal processing that bends and folds sheet metal, which is able to deform resiliently. In the common charging terminals 7, one end of a sheet metal piece is bent at a right angle to form a mounting section 7B to attach each sheet metal piece to a circuit board 13. A resiliently deforming section 7C bent in a U-shape joins with each mounting section 7B. A spring-action arm 7D joins with each resiliently deforming section 7C via a bend that is greater than 90°, and a contact section 7A to make contact with batteries 3 is established at the end of each spring-action arm 7D.

The contact section 7A of each common charging terminal 7 is divided in two and a projecting region 7b, which protrudes towards the end plane of a battery, is established on each divided section 7a. Each projecting region 7b presses against a battery electrode to make contact in a manner that avoids contact failure. Further, the end region 7c of the contact section 7A is bent to fold around the backside putting the end region 7c in close proximity with the backside of the spring-action arm 7D.

Temperature sensors 14 are sandwiched between end regions 7c and the backsides of the spring-action arms 7D. Each temperature sensor 14 is thermally connected with a battery electrode via the contact section 7A of a common charging terminal 7. Battery heat is transferred to a temperature sensor 14 via the contact section 7A. As a result, a temperature sensor 14 detects battery temperature via the contact section 7A of a common charging terminal 7. A temperature sensor 14 disposed at this position can accurately detect battery temperature, and in particular, can accurately detect battery temperature even in a battery charger that cools batteries 3 with forced ventilation. This is because the temperature sensor 14 is not cooled by the forced air that cools the batteries 3.

Further, a cooling fan 20 is housed in the case 1 of the battery charger to provide forced ventilation of the battery attachment section 2 and cool rechargeable batteries 3 being charged by passing cooling air over them. In this battery charger, ventilation holes 21 are provided in the bottom surface of the battery attachment section 2. The ventilation holes 21 are openings that pass through the bottom surface of the battery attachment section 2. The case 1 has a plurality of slits arranged in parallel to form ventilation holes 21. The case 1, which has ventilation holes 21 through it, houses the fan 20. The fan 20 forces air towards the ventilating holes 21 to forcibly cool rechargeable batteries 3 in the battery attachment section 2. The bottom panel 1A of the case 1 has outside air intake holes 22 opened through it. When the fan 20 is operating, air is introduced inside the case 1 through the intake holes 22, the fan 20 accelerates the flow of introduced air, air is forced into the battery attachment section 2 through the ventilating holes 21, and the rechargeable batteries 3 are cooled. In the case 1, a plurality of slits, which are parallel to the battery pockets 10, are opened through the bottom of the battery attachment section 2 and act as ventilating holes 21. However, the ventilating holes may also be slits in a direction perpendicular to the battery pockets, or they may be numerous round holes.

When battery temperature rises above a set temperature, the fan 20 operates to provide forced air ventilation and cool the rechargeable batteries 3. However, the fan 20 may also operate whenever rechargeable batteries 3 are charged to cool the rechargeable batteries 3 during charging.

In the battery charger of the figures, a film-type temperature sensor 14 is sandwiched between the end region 7c and the backside of the spring-action arm 7D of a common charging terminal 7. The end region 7c applies pressure in a resilient fashion against the backside of the spring-action arm 7D, and a film-type temperature sensor 14 is sandwiched between those parts.

The battery charger is provided with decision switch mechanisms 5 to determine the types of the batteries 3 loaded in the attachment section 2; namely, to distinguish between long batteries and short batteries. A decision switch mechanism 5 is a switch that switches OFF or ON when pressed by a battery 3 loaded in the attachment section 2, 32. The battery charger of FIGS. 12-14 has decision switch mechanisms 5 made up of short battery charging terminals 9 and long battery charging terminals 8. Decision switch mechanisms 5 made up of short battery charging terminals 9 and long battery charging terminals 8 are disposed inside the stepped shelf regions 12. This structure has the characteristic that decision switch mechanisms 5 can utilize space inside the stepped shelf regions 12.

A short battery charging terminal 9 that also serves as a decision switch mechanism 5 is a piece of sheet metal formed in a U-shape. The back of this short battery charging terminal 9 is an attachment end 9B that mounts on an insulating circuit board 15, and the front is a contact arm 9A. Insertion tabs 9b are provided on both sides of the attachment end 9B. The insertion tabs 9b pass through slits in the insulating circuit board 15 to attach the short battery charging terminal 9 in a fixed position. The insertion tabs 9b are soldered to hold the attachment end 9B of the short battery charging terminal 9 in place on the insulating circuit board 15. With this configuration, a short battery charging terminal 9 can be fixed in an accurate position on the insulating circuit board 15. The insulating circuit board 15 is mounted inside the case 1 in a vertical disposition. The upper section of each contact arm 9A presses resiliently against a short battery 3B projecting electrode, which is the positive electrode, to make electrical contact. A contact arm 9A is provided with a projecting region 9a on the surface that contacts the short battery 3B, and the projecting region 9a presses against the battery electrode.

This short battery charging terminal 9 is pressed upon by the electrode of a short battery 3B loaded in the battery attachment section 2 to contact a long battery charging terminal 8. When the short battery charging terminal 9 is not pressed upon by a short battery 3B, it is separated from the long battery charging terminal 8 in a non-contact state.

The long battery charging terminal 8 that makes up a decision switch mechanism 5 is a piece of sheet metal formed by bending and folding. The front end of a long battery charging terminal 8 is bent down at a right angle to form a bent end 8B, and this bent end 8B is attached to the insulating circuit board 15 that holds a short battery charging terminal 9. The bent end 8B is attached above the attachment end 96 of the short battery charging terminal 9, and separated from the short battery charging terminal 9. The bent end 8B of the long battery charging terminal 8 is attached to the insulating circuit board 15 to position it behind the contact arm 9A of the short battery charging terminal 9.

In this decision switch mechanism 5, a short battery 3B loaded in the battery attachment section 2 presses the contact arm 9A of the short battery charging terminal 9 toward the bent end 8B of the long battery charging terminal 8 to cause the short battery charging terminal 9 to contact the long battery charging terminal 8. When a short battery 3B is not loaded in the attachment section 2, the contact arm 9A of the short battery charging terminal 9 is not pressed by the battery 3. In this state, the short battery charging terminal 9 is separated from the long battery charging terminal 8 in a non-contact state. The short battery charging terminal 9, which is made from resiliently deforming sheet metal, is formed in a U-shape that is positioned so as not to contact the long battery charging terminal 8 when it is not pressed upon by a short battery 3B.

Figure 12:
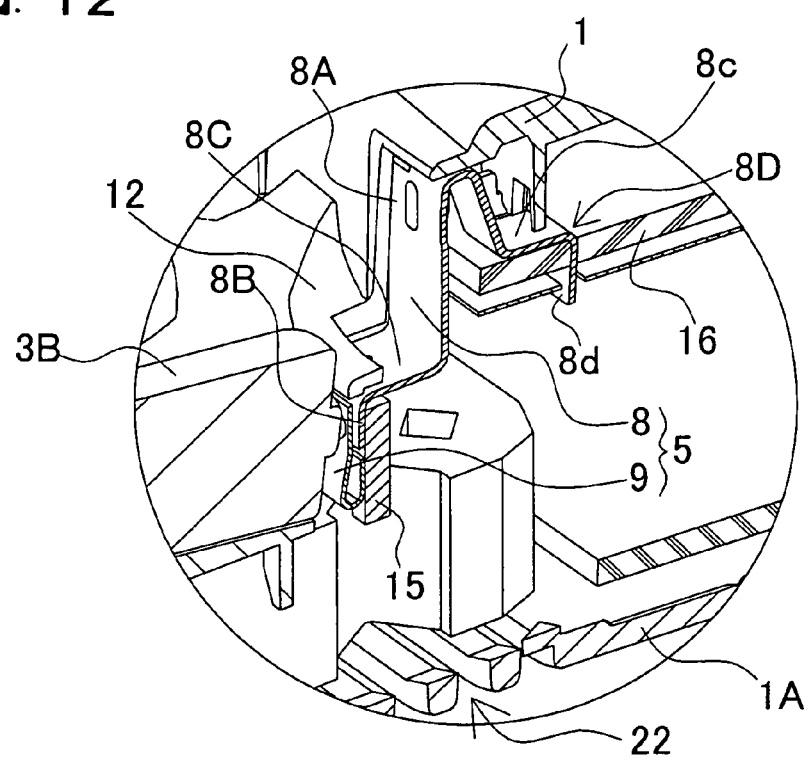
FIG. 12 is a perspective view partially in cross-section showing a decision switch mechanism.
Figure 13:
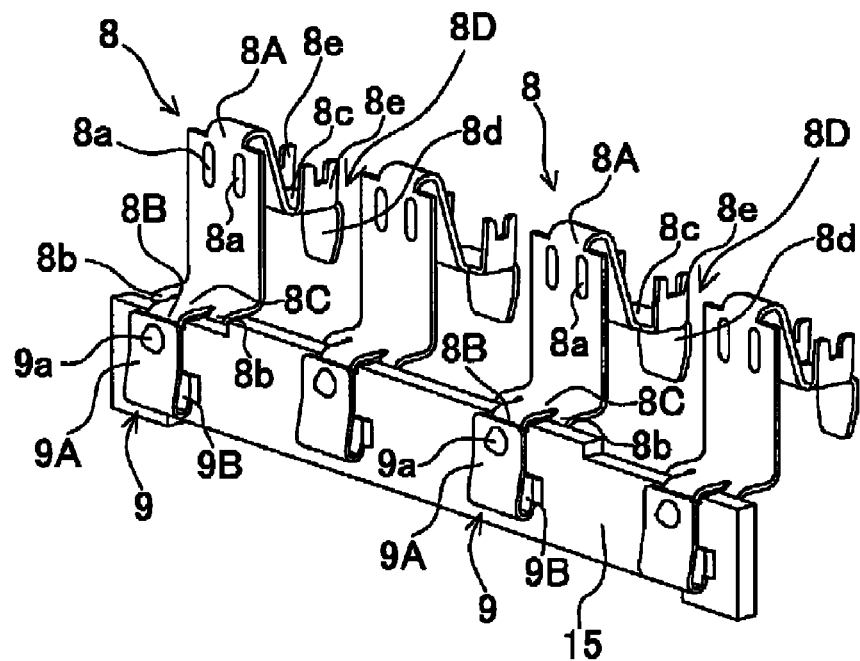
FIG. 13 is a perspective view showing long battery charging terminals and short battery charging terminals of the decision switch mechanisms shown in FIG. 12.
Figure 14:
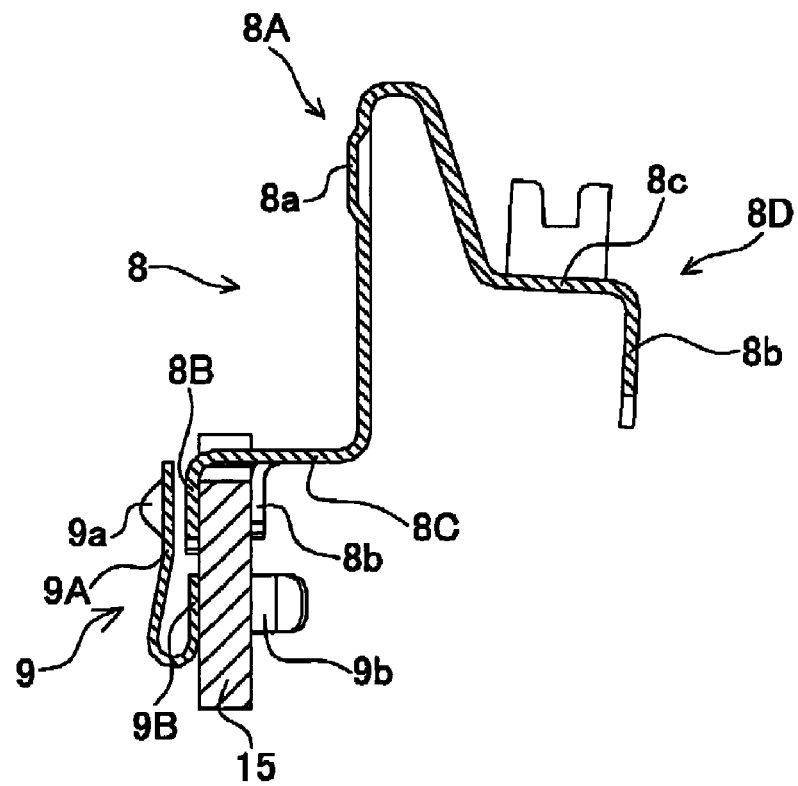
FIG. 14 is a cross-sectional view of the long battery charging terminals and short battery charging terminals shown in FIG. 13.

A long battery charging terminal 8 has a horizontal section 8C extending rearward from the bent end 8B, and this horizontal section 8C is disposed inside a stepped shelf region 12. A long battery 3A contact section 8A is established by an upward bend from the horizontal section 8C. The top of the contact section 8A is folded back to a rear mounting section 8D, which mounts on a printed circuit board 16. As shown in FIGS. 12-14, the horizontal section 8C is provided with clasps 8b on both sides to mate with the backside of the insulating circuit board 15. The bent end 8B and clasps 8b of a long battery charging terminal 8 grip the insulating circuit board 15 from both sides to attach the long battery charging terminal 8 in an easy, simple, and sturdy fashion. The contact section 8A is provided with a projecting region 8a on the surface that contacts the long battery 3A, and the projecting region 8a presses against the battery electrode.

The mounting section 8D, which is the back end of a long battery charging terminal 8, is made up of a rearward extending horizontal section 8c and an insert 8b that passes through the printed circuit board 16. As shown in the perspective view of FIG. 13, the horizontal section 8c is provided with side tabs 8e that bend upward from both sides. These side tabs 8e establish an insertion trough to insert an inside wall of the case 1. These long battery charging terminals 8 can be disposed in fixed positions in the case 1 by mating the insertion trough of the side tabs 8e with the inside wall of the case 1.

A circuit diagram for the battery charger described above is shown in FIGS. 15 and 16. This battery charger is provided with a control circuit 6, which includes a microprocessor, and controls charging current to batteries 3 set in the battery attachment section 2; and a power supply circuit 17, which is controlled by the control circuit 6, and charges batteries 3 with optimum charging current. The output of the power supply circuit 17 is connected to a long battery charging terminal 8 via a charging switch 18. A short battery charging terminal 9 connects to the power supply circuit 17 via the long battery charging terminal 8. A short battery 3B is charged when the short battery charging terminal 9 contacts the long battery charging terminal 8. The charging switch 18 is controlled by the control circuit 6, is ON when charging a battery 3, and is switched OFF when not charging.

The control circuit 6 detects the voltage of the long battery charging terminal 8 and the short battery charging terminal 9, determines if the decision switch mechanism 5 is ON or OFF, and controls battery 3 charging current. In a battery charger with the circuit structure, the charging switch 18 is OFF when the control circuit 6 detects whether the decision switch mechanism 5 is ON or OFF. After the control circuit 6 determines the battery type by the ON or OFF state of the decision switch mechanism 5, it turns the charging switch 18 ON to begin charging. The control circuit 6 is provided with an input port A that reads voltage from a line electrically connected to the long battery charging terminal 8, and input port B that reads voltage via a resistor and diode from a line electrically connected to the short battery charging terminal 9. Further, for the control circuit 6 to verify connection of the long battery charging terminal 8 and short battery charging terminal 9, a power supply voltage Vcc provided by another circuit (not illustrated) is connected to the long battery charging terminal 8 via a pull-up resistor R.

Figure 15:
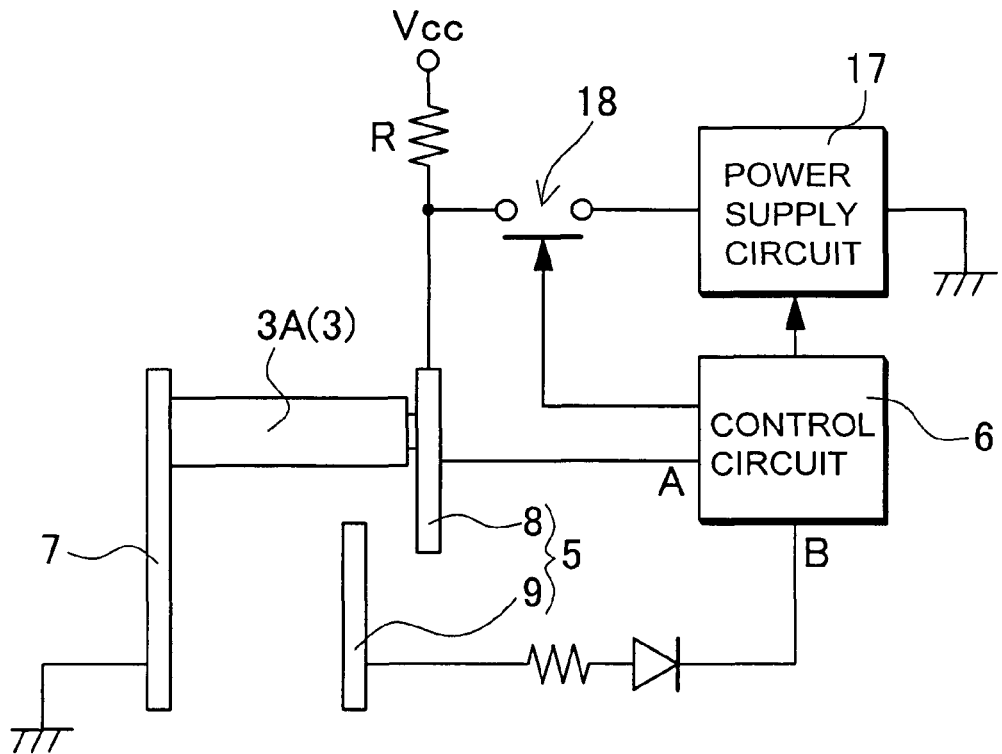
FIG. 15 is a circuit schematic of a battery charger for one embodiment of the present invention showing attachment of a long battery.

Operation of a decision switch mechanism 5 and control circuit 6 when a long battery 3A is attached is described below (refer to FIG. 15). The control circuit 6 first detects a voltage drop at input port A from Vcc with no battery 3 attached to the battery voltage with a long battery 3A attached. This determines battery attachment. With battery voltage detected at the long battery charging terminal 8 and no battery voltage detected at the short battery charging terminal 9, the decision switch mechanism 5 is judged to be OFF. With the decision switch mechanism 5 determined to be in the OFF state, the attached battery 3 is judged to be a long battery 3A. This situation is shown in FIG. 15.

Figure 16:
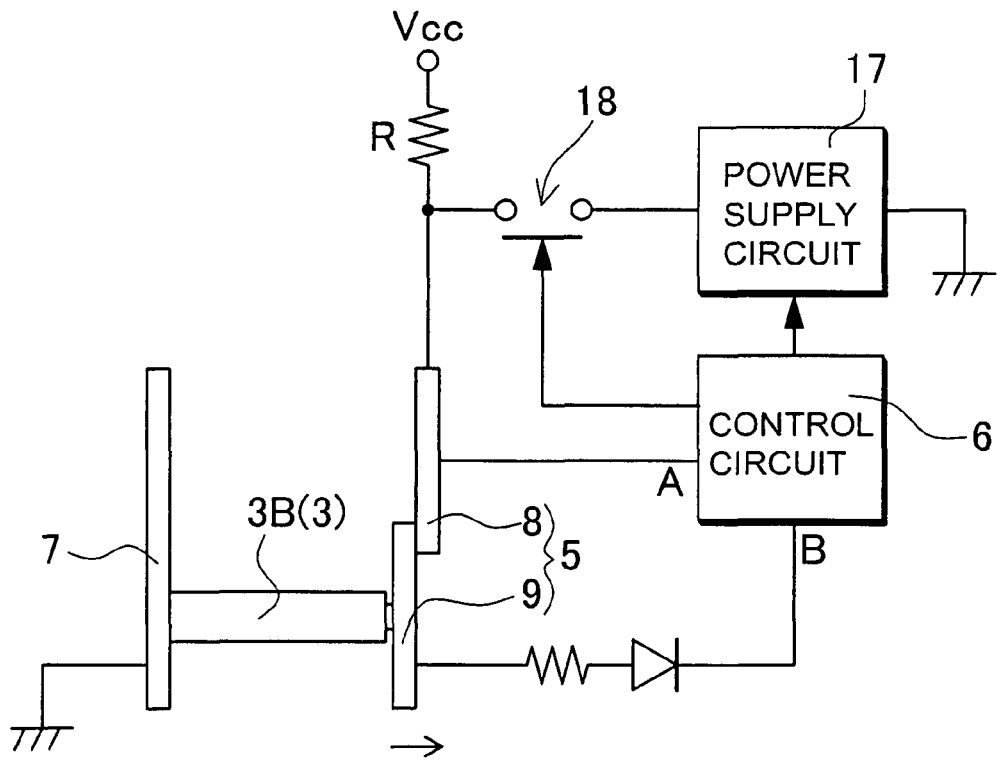
FIG. 16 is a circuit schematic of a battery charger for one embodiment of the present invention showing attachment of a short battery.

Operation of a decision switch mechanism 5 and control circuit 6 when a short battery 3B is attached is described below (refer to FIG. 16). The control circuit 6 first detects a voltage drop at input port A from Vcc with no battery 3 attached to the battery voltage with a short battery 3A attached. This determines battery attachment. When the control circuit 6 detects battery voltage above respective specified values at both input port A from the long battery charging terminal 8 and input port B from the short battery charging terminal 9, the decision switch mechanism 5 is judged to be ON. With the decision switch mechanism 5 determined to be in the ON state, the attached battery 3 is judged to be a short battery 3B. This situation is shown in FIG. 16.

The battery charger described above can detect abnormal battery conditions from battery voltage, as well as determining the type of battery 3 set in the attachment section 2, and beginning charging. With the charging switch 18 OFF, voltage of a short battery 3B or long battery 3A set in the attachment section 2 can be detected, and battery conditions such as whether the battery is abnormal or not can be determined from the battery voltage. Subsequently, the charging switch 18 can be turned ON to begin charging. For example, a battery with abnormally low battery voltage can be aborted from charging, or a battery with voltage below a set voltage can be charged by normal charging but not by rapid charging. A battery with voltage within a specified range can be treated as a normal battery, and control can begin operations such as rapid charging.

It is not always necessary for the battery charger of the present invention to detect voltage at both the long battery charging terminal and short battery charging terminal to determine if the decision switch mechanism is ON or OFF. This is because no battery voltage is output from the short battery charging terminal when a long battery is attached and the decision switch mechanism is OFF, and battery voltage is output from the short battery charging terminal when a short battery is attached and the decision switch mechanism is ON. Therefore, the decision switch mechanism can be judged ON when battery voltage is output from the short battery charging terminal, and judged OFF when battery voltage is not output from the short battery charging terminal.

When the control circuit 6 detects a decision switch mechanism 5 ON and determines a short battery 3B is loaded in the battery attachment section 2, charging current output from the power supply circuit 17 is set to the second charging current, which is the optimum charging current for short batteries 3B, and the charging switch 18 is turned ON to charge the short battery 3B. With the charging switch 18 ON, second charging current output from the power supply circuit 17 is supplied to the short battery charging terminal 9 via the long battery charging terminal 8 to charge the short battery 3B making contact with the short battery charging terminal 9. When the control circuit 6 detects a decision switch mechanism 5 OFF and determines a long battery 3A is loaded in the battery attachment section 2, charging current output from the power supply circuit 17 is set to the first charging current, which is the optimum charging current for long batteries 3A, and the charging switch 18 is turned ON to charge the long battery 3A. Since a long battery 3A electrode is in contact with the long battery charging terminal 8, output from power supply circuit 17 is supplied from the long battery charging terminal 8 to the long battery 3A to charge the long battery 3A.

Figure 17:
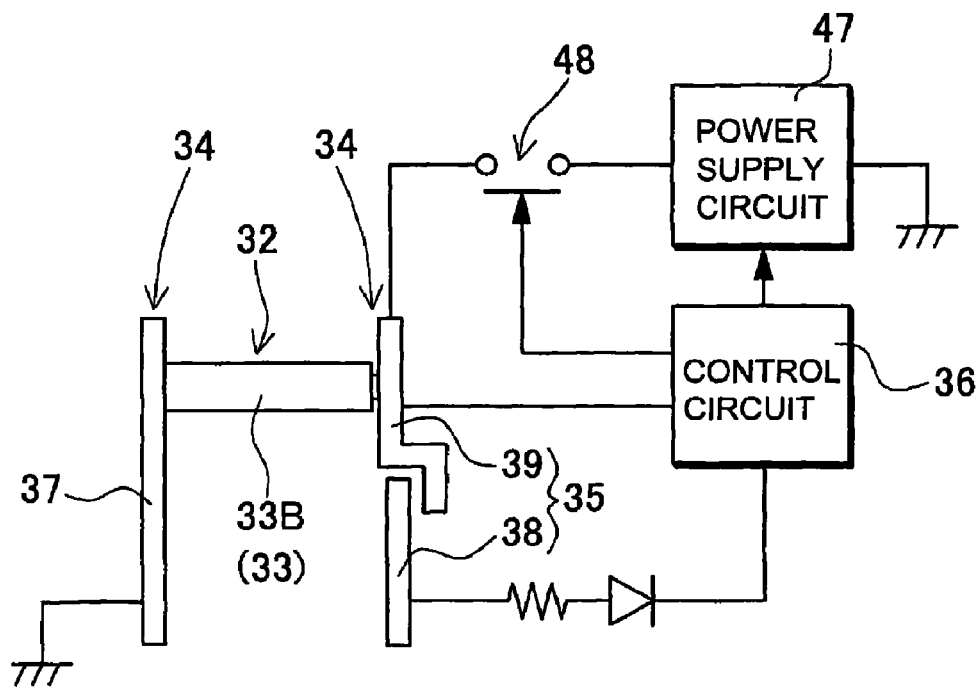
FIG. 17 is a circuit schematic of a battery charger for another embodiment of the present invention showing attachment of a short battery.
Figure 18:
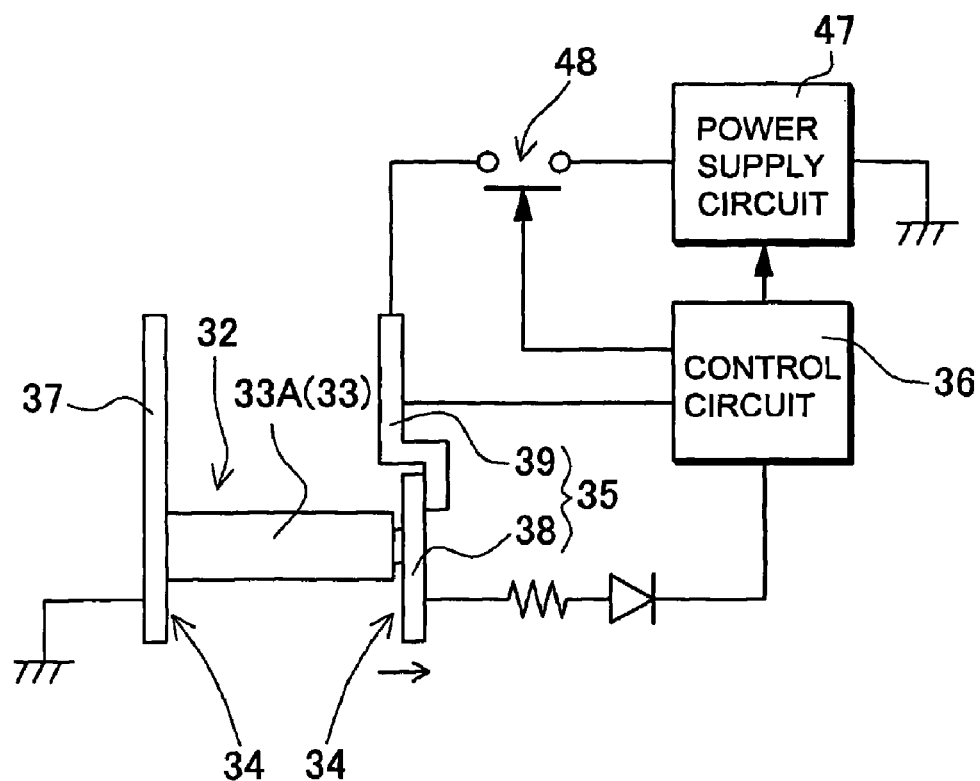
FIG. 18 is a circuit schematic of a battery charger for another embodiment of the present invention showing attachment of a long battery.

In the battery charger described above, the decision switch mechanism 5 is ON when a short battery 3B is attached, and OFF when instead a long battery 3A is attached. However, as shown in FIGS. 17-19, the battery charger of the present invention may also have a decision switch mechanism 35 that is ON when a long battery 33A is attached, and OFF when instead a short battery 3B is attached.

In the battery charger shown in these figures, a long battery charging terminal 38 is pressed by the electrode of a long battery 33A loaded in the battery attachment section 32 to contact the short battery charging terminal 39 and turn the decision switch mechanism 35 ON. When a short battery 33B is attached instead of a long battery 33A, the long battery charging terminal 38 is not pressed. As a result, the long battery charging terminal 38 is separated from the short battery charging terminal 39 in a non-contact state, and the decision switch mechanism 35 is OFF. In FIGS. 17 and 18, reference numeral 34 denotes charging terminals, and reference numeral 37 denotes common charging terminals.

Figure 19:
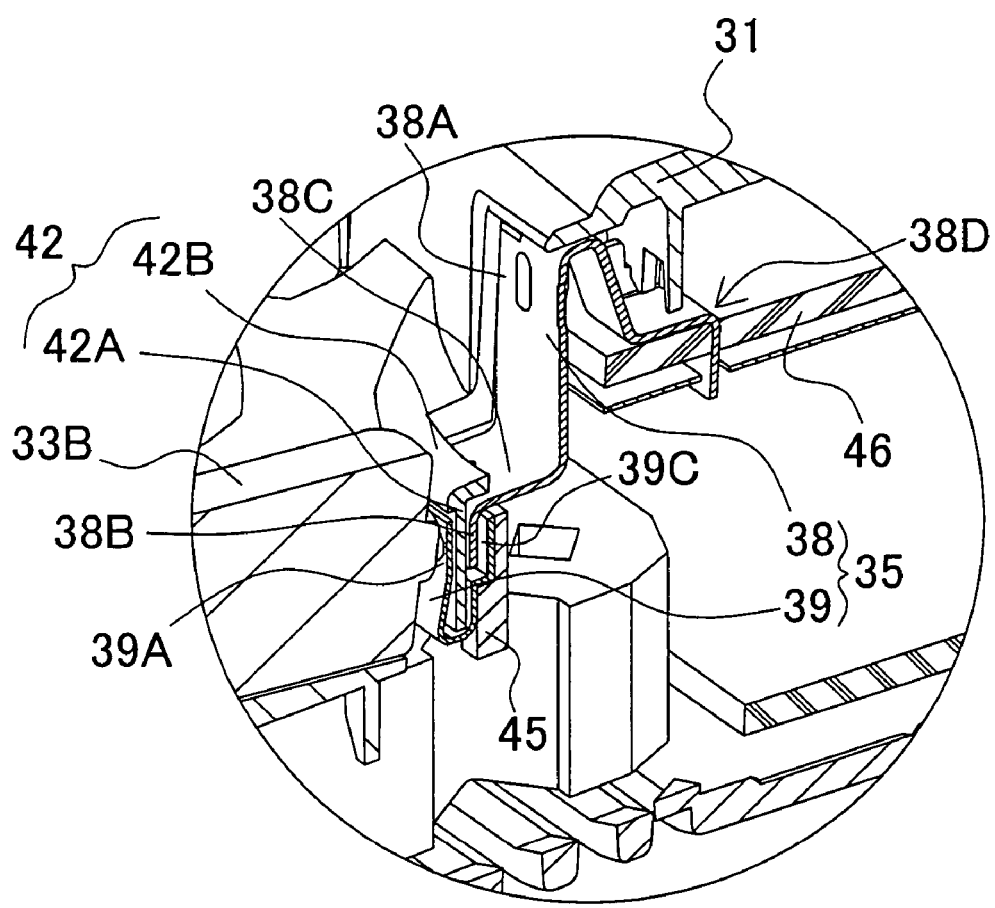
FIG. 19 is a perspective view partially in cross-section showing another embodiment of a decision switch mechanism.

The short battery charging terminal 39 of FIG. 19 is a piece of sheet metal formed in a U-shape. The back of this short battery charging terminal 39 is an attachment end (not illustrated) that mounts on an insulating circuit board 45, and the front is a contact arm 39A. The insulating circuit board 45 is attached to the case 1 in a vertical disposition. In the short battery charging terminal 39, a step section is established on the back as a contact section 39C for contact with the long battery charging terminal 38. This contact section 39C is disposed in a manner separated from the bent end 38B established at the end of the long battery charging terminal 38. The short battery charging terminal 39 is attached to the insulating circuit board 45 in a manner that positions the contact section 39C behind the bent end 38B. The upper section of the contact arm 39A presses resiliently against a short battery projecting electrode, which is the positive electrode, to make electrical contact. In addition, an insulating panel, which is the electrode alignment surface 42A of a stepped shelf region 42, is disposed behind the contact arm 39A. Even if the contact arm 39A of this short battery charging terminal 39 is pressed upon by the electrode of a short battery 33B loaded in the battery attachment section 32, it will not contact the long battery charging terminal 38, and the short battery charging terminal 39 and long battery charging terminal 39 will be in a non-contact state.

The long battery charging terminal 38 of FIG. 19 is a piece of sheet metal formed by bending and folding. The front end of the long battery charging terminal 38 is bent down at a right angle to form a bent end 38B. When a long battery 33A is attached, this bent end 38B is configured to make contact with the contact section 39C of the short battery charging terminal 39. The long battery charging terminal 38 is disposed to position the bent end 38B in front of the contact section 39C of the short battery charging terminal 39. The long battery charging terminal 38 has a horizontal section 38C extending rearward from the bent end 38B, and this horizontal section 38C is disposed inside a stepped shelf region 42. A long battery contact section 38A is established by an upward bend from the horizontal section 38C. The top of the contact section 38A is folded back to a rear mounting section 38D, which mounts on a printed circuit board 46. The contact section 38A, the horizontal section 38C, and the bent end 38B act as a moveable unit of the long battery charging terminal 38. The long battery charging terminal 38 is resiliently deforming and configured such that the entire moveable unit will move when the contact section 38A is pressed upon by a long battery 33A loaded in the battery attachment section 32. In this decision switch mechanism 35, when a long battery 33A loaded in the battery attachment section 32 presses against the contact section 38A of the long battery charging terminal 38, the bent end 38B moves toward the contact section 39C of the short battery charging terminal 39 to cause the long battery charging terminal 38 to contact the short battery charging terminal 39. When a long battery 33A is not loaded in the battery attachment section 32, the contact section 38A of the long battery charging terminal 38 is not pressed by a battery 33. In this state, the long battery charging terminal 38 is separated from the short battery charging terminal 39 in a non-contact state. The long battery charging terminal 38, which is made from resiliently deforming sheet metal, is formed in a shape such that the bent end 38B does not contact the contact section 39C of the short battery charging terminal 39 when the long battery charging terminal 38 is not pressed by a long battery 33A.

A battery charger with the circuit structure shown in FIGS. 17 and 18 charges long batteries 33A and short batteries 33B as described below. When a long battery 33A is loaded in the attachment section 32, the long battery 33A presses against the contact section 38A of the long battery charging terminal 38, the bent end 38B contacts the contact section 39C of the short battery charging terminal 39, and the decision switch mechanism 35 turns ON. The control circuit 36 detects the decision switch mechanism 35 in the ON state, that is it detects contact between the long battery charging terminal 38 and short battery charging terminal 39, and it controls the power supply circuit 47 to output the first charging current, which is the optimum charging current for a long battery 33A. The control circuit 36 also turns ON the charging switch 48 to charge the long battery 33A. When a short battery 33B is loaded in the attachment section 32 instead of a long battery 33A, it does not press against the long battery charging terminal 38, the bent end 38B of the long battery charging terminal 38 does not contact the contact section 39C of the short battery charging terminal 39, and the decision switch mechanism 35 is OFF. The control circuit 36 detects the decision switch mechanism 35 in the OFF state, and it controls the power supply circuit 47 to output the second charging current, which is the optimum charging current for a short battery 33B. The control circuit 36 also turns ON the charging switch 48 to charge the short battery 33B.

As this invention may be embodied in several forms without departing from the spirit and essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims. This application is based on Application No. 2005-285638 filed in Japan on Sep. 29, 2005, the content of which is incorporated herein by reference.

What is claimed is:

1. A battery charger comprising:
   a case having a battery attachment section capable of attaching longer sized batteries or shorter sized batteries;
   charging terminals for contacting electrodes at both ends of the longer sized batteries or the shorter sized batteries, when attached in the battery attachment section, and supplying charging current to those batteries;
   decision switch mechanisms for distinguishing the types of batteries attached in the battery attachment section; and
   a control circuit for controlling charging current for batteries attached in the battery attachment section based on signals from the decision switch mechanisms,
   the charging terminals comprising:
   a common charging terminal for contacting an electrode of the longer and shorter sized batteries;
   a longer sized battery charging terminal and a shorter sized battery charging terminal disposed at an opposite side of the battery attachment section relative to the common charging terminal, wherein a distance between the longer sized battery charging terminal and the common charging terminal and a distance between the shorter sized battery charging terminal and the common charging terminal are fixed; and
   a stepped shelf region disposed in the battery attachment section and having electrode alignment surfaces for holding an end of the shorter sized battery in a fixed position and aligning an electrode of the shorter sized battery with the shorter sized battery charging terminal to provide contact between the charging terminals and electrodes of the shorter sized battery, wherein the decision switch mechanisms are disposed inside of the stepped shelf region, and each of the decision switch mechanisms is a switch that switches when pressed by the battery electrode of either the longer sized battery or the shorter sized battery when attached in the battery attachment section, and the control circuit switches charging current between a first charging current and a second charging current to charge longer sized batteries or shorter sized batteries, respectively, depending on the OFF or ON state of the decision switch mechanism.

2. The battery charger as recited in claim 1, wherein the longer sized battery charging terminal is disposed on the stepped shelf region and in a position facing an electrode of the longer sized battery when set over a top level of the stepped shelf region, and the shorter sized battery charging terminal is disposed in a surface of a lower protruding region of the stepped shelf region for aligning the opposite electrodes of the shorter battery.

3. The battery charger as recited in claim 2, wherein the decision switch mechanism is made up of the shorter sized battery charging terminal and the longer sized battery charging terminal, and wherein the longer sized battery charging terminal is aligned with the shorter sized battery charging terminal in a vertical direction of the stepped shelf region.

4. The battery charger as recited in claim 3, wherein the shorter sized battery charging terminal is a resiliently deformable sheet metal piece, the shorter sized battery charging terminal is positioned so that it is pressed by an electrode of a shorter sized battery attached in the battery attachment section such that the shorter sized battery charging terminal contacts the longer sized battery charging terminal, and the shorter sized battery charging terminal is separated from the longer sized battery charging terminal in a non-contact state when the shorter sized battery charging terminal is not pressed by a shorter sized battery;

when a shorter sized battery is attached in the battery attachment section, the shorter sized battery presses against the shorter sized battery charging terminal causing it to contact the longer sized battery charging terminal, and thereby the control circuit detects contact between the shorter sized battery charging terminal and the longer sized battery charging terminal, and the shorter sized battery is charged with the second charging current;

when a shorter sized battery is not attached in the battery attachment section and a longer sized battery is attached, the shorter sized battery charging terminal is separated from the longer sized battery charging terminal, and thereby the control circuit detects the non-contact state between the shorter sized battery charging terminal and the longer sized battery charging terminal, and the longer sized battery is charged with the first charging current.

5. The battery charger as recited in claim 1, wherein the longer sized battery charging terminal is disposed behind the shorter sized battery charging terminal inside the stepped shelf region, a shorter sized battery attached in the battery attachment section presses the shorter sized battery charging terminal toward the longer sized battery charging terminal, and causes the shorter sized battery charging terminal to contact the longer sized battery charging terminal.

6. The battery charger as recited in claim 3, wherein the longer sized battery charging terminal is a resiliently deformable sheet metal piece, the longer sized battery charging terminal is disposed in a position such that it is pressed upon by an electrode of a longer sized battery attached in the battery attachment;

when a longer sized battery is attached in the battery attachment section, the longer sized battery presses against the longer sized battery charging terminal causing it to contact the shorter sized battery charging terminal, the control circuit detects contact between the longer sized battery charging terminal and shorter sized battery charging terminal, and the longer sized battery is charged with a first charging current;

when a longer sized battery is not attached in the battery attachment section and a shorter sized battery is attached, a longer sized battery does not press against the longer sized battery charging terminal, the longer sized battery charging terminal is separated from the shorter sized battery charging terminal, the control circuit detects a non-contact state between the longer sized battery charging terminal and the shorter sized battery charging terminal, and the shorter sized battery is charged with the second charging current.

7. The battery charger as recited in claim 3, wherein the control circuit detects shorter sized battery charging terminal voltage to detect contact or non-contact between the shorter sized battery charging terminal and longer sized battery charging terminal.

8. The battery charger as recited in claim 7, wherein power supply voltage Vcc is supplied to the longer sized battery charging terminal via a pull-up resistor R.

9. The battery charger as recited in claim 3, wherein the control circuit detects longer sized battery charging terminal voltage to control longer sized battery charging current.

10. The battery charger as recited in claim 9, wherein power supply voltage Vcc is supplied to the shorter sized battery charging terminal via a pull-up resistor R.

11. The battery charger as recited in claim 1, wherein the battery attachment section of the case has battery pockets that allow four rows of longer sized batteries or shorter sized batteries to be loaded.

12. The battery charger as recited in claim 1, wherein a temperature sensor is provided in the common charging terminal.

13. The battery charger as recited in claim 10, wherein a temperature sensor is sandwiched between an end of the common charging terminal and a backside of a spring-action arm of the common charging terminal.

14. The battery charger as recited in claim 1, wherein the shorter sized battery charging terminal and the longer sized battery charging terminal are vertically aligned in the stepped shelf region.

15. A battery charger comprising:

a case having a battery attachment section capable of attaching longer sized batteries or shorter sized batteries;

charging terminals for contacting electrodes at both ends of the longer sized batteries or the shorter sized batteries attached in the battery attachment section, and for supplying charging current to batteries attached in the battery attachment section;

decision switch mechanisms for distinguishing the types of batteries attached in the battery attachment section; and a control circuit for controlling charging current for batteries attached in the battery attachment section based on signals from the decision switch mechanisms, the charging terminals comprising:

a common charging terminal for contacting an electrode of the longer and shorter sized batteries; and a longer sized battery charging terminal and a shorter sized battery charging terminal disposed at an opposite side of the battery attachment section relative to the common charging terminal, wherein a distance between the longer sized battery charging terminal and the common charging terminal and a distance between the shorter sized battery charging terminal and the common charging terminal are fixed, wherein a stepped shelf region is disposed in the battery attachment section, the stepped shelf region having electrode alignment surfaces for holding an end of the shorter sized battery in a fixed position and aligning an electrode of the shorter sized battery with the shorter sized battery charging terminal to provide contact between the charging terminals and electrodes of the shorter sized battery, wherein the decision switch mechanisms are disposed inside of the stepped shelf region, and each of the decision switch mechanisms is a switch that switches between an OFF state and an ON state when pressed by the battery electrode of the longer sized battery or the shorter sized battery when attached in the battery attachment section, wherein the switch includes the longer sized battery charging terminal and the shorter sized battery charging terminal, one of the longer sized battery charging terminal and the shorter sized battery charging terminal being a resiliently deformable member which deforms to contact the other of the longer sized battery charging terminal and the shorter sized battery charging terminal such that the decision switch mechanism switches between the OFF state and the ON state, and wherein the control circuit switches charging current between a first charging current and a second charging current to charge longer sized batteries or shorter sized batteries, respectively, depending on the OFF or ON state of the decision switch mechanism.

16. A battery charger comprising:

a case having a battery attachment section capable of attaching longer sized batteries or shorter sized batteries;

charging terminals for contacting electrodes at both ends of the longer sized batteries or the shorter sized batteries attached in the battery attachment section, and for supplying charging current to batteries attached in the battery attachment section; and a control circuit for controlling charging current for batteries attached in the battery attachment section, the charging terminals comprising:

a common charging terminal for contacting an electrode of the longer and shorter sized batteries; and a longer sized battery charging terminal and a shorter sized battery charging terminal disposed at an opposite side of the battery attachment section relative to the common charging terminal, wherein a distance between the longer sized battery charging terminal and the common charging terminal and a distance between the shorter sized battery charging terminal and the common charging terminal are fixed, wherein a stepped shelf region is disposed in the battery attachment section, the stepped shelf region including electrode alignment surfaces for holding batteries attached in the battery attachment section in electrical contact with the charging terminal, wherein the longer sized battery charging terminal and the shorter sized battery charging terminal constitute a decision switch mechanism for distinguishing the types of batteries attached in the battery attachment section, one of the longer sized battery charging terminal and the shorter sized battery charging terminal being a resiliently deformable member which deforms to contact the other of the longer sized battery charging terminal and the shorter sized battery charging terminal such that the decision switch mechanism switches between an OFF state and an ON state, wherein the decision switch mechanism switches between the OFF state and the ON state when pressed by the battery electrode of the longer sized battery or the shorter sized battery when attached in the battery attachment section, and wherein the control circuit switches charging current between a first charging current and a second charging current to charge longer sized batteries or shorter sized batteries, respectively, depending on the OFF or ON state of the decision switch mechanism.

17. The battery charger of claim 16, wherein each of the longer sized battery charging terminal and the shorter sized battery charging terminal are disposed inside of the stepped shelf region.

18. The battery charger of claim 16, wherein the longer sized battery charging terminal is aligned with the shorter sized battery charging terminal in a vertical direction of the stepped shelf region and is staggered from the shorter sized battery charging terminal in a horizontal direction of the stepped shelf region such that the longer sized battery charging terminal is disposed above the shorter sized battery when the shorter sized battery is attached in the attachment section.

19. The battery charger of claim 16, wherein the longer sized battery charging terminal is arranged in the stepped shelf region such that the longer sized battery charging terminal deforms and contacts the shorter sized battery charging terminal when pressed by the battery electrode of the longer sized battery.

20. The battery charger of claim 16, wherein the shorter sized battery charging terminal is arranged in the stepped shelf region such that the shorter sized battery charging terminal deforms and contacts the larger sized battery charging terminal when pressed by the battery electrode of the shorter sized battery.

* * * * *